US006314229B1

(12) United States Patent
Sasaki et al.

(10) Patent No.: US 6,314,229 B1
(45) Date of Patent: Nov. 6, 2001

(54) END SEAL STRUCTURE FOR CABLE CLOSURE

(75) Inventors: Daijiro Sasaki; Tadashi Hattori; Toshiaki Uehara, all of Tokyo (JP)

(73) Assignee: Japan Recom Ltd. (JP)

( * ) Notice: Subject to any disclaimer, the term of this patent is extended or adjusted under 35 U.S.C. 154(b) by 0 days.

(21) Appl. No.: 09/264,993

(22) Filed: Mar. 9, 1999

(30) Foreign Application Priority Data

Mar. 9, 1998 (JP) .................................................. 10-073067

(51) Int. Cl.[7] ...................................................... G02B 6/00
(52) U.S. Cl. ............................................................ 385/135
(58) Field of Search ................................... 385/134–136, 385/147; 174/135, 69, 77 R, 84 R, 93

(56) References Cited

U.S. PATENT DOCUMENTS

| 3,634,608 | * | 1/1972 | Buhl et al. ........................ 174/153 G |
| 4,117,259 |   | 9/1978 | Giebel et al. ........................... 174/92 |
| 5,568,584 |   | 10/1996 | Smith .................................... 385/135 |
| 5,886,300 | * | 3/1999 | Strickler .............................. 174/135 |
| 6,085,013 | * | 7/2000 | Yatsu ................................... 385/135 |

FOREIGN PATENT DOCUMENTS 43 22 032 C 1   6/1994 (DE) .
0 514 174 A 1   11/1992 (EP) .

OTHER PUBLICATIONS

Abstract of Japan Publication No. 08237850, Sept. 1996.

* cited by examiner

*Primary Examiner*—Robert H. Kim
*Assistant Examiner*—Michael P. Stafira
(74) *Attorney, Agent, or Firm*—Lerner, David, Littenberg, Krumholz & Mentlik, LLP

(57) ABSTRACT

An end seal structure for a cable closure capable of ensuring insertion of cables different in diameter into a receiving casing for a cable connection without any sealing tape and substantially facilitating both assembling and disassembling thereof. A split cable spacer which is made of a vulcanized rubber composition of 0 to 10 in hardness or 40 to 90 ($10^{-1}$ mm) in penetration, and of 500 to 2000% in elongation and 10 to 60 kgf/cm$^2$ in tensile strength is arranged so as to be pressedly contacted with outer peripheries of cables. The split cable spacer is integrally provided with a plurality of seal ribs, which are arranged along the cable insertion passages in a manner to be opposite to each other and spaced from each other at predetermined intervals. A split end seal base is is provided with a hinge which permits the split end seal base to be pivotally split into two halves. The split cable spacer is fittedly held in the split end seal base, so that halves of the split cable spacer may be detachably joined to each other through abutting joint faces thereof.

24 Claims, 15 Drawing Sheets

FIG. 3A
FIG. 3B
FIG. 3C
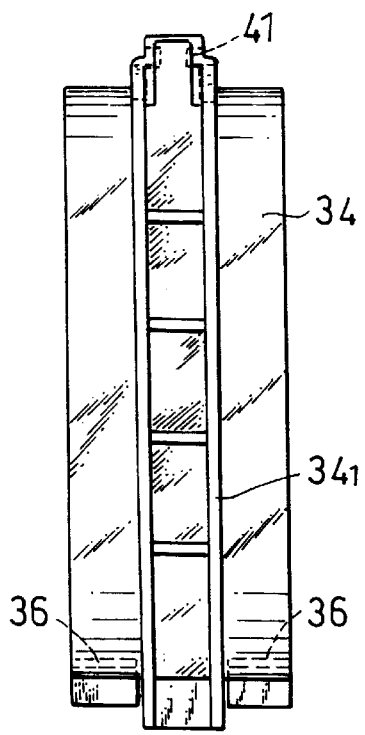
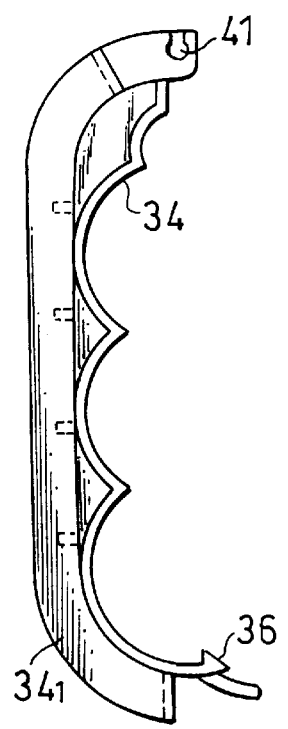
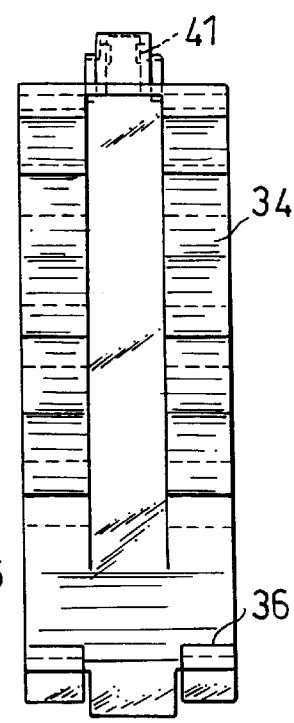
FIG. 3D
FIG. 3E
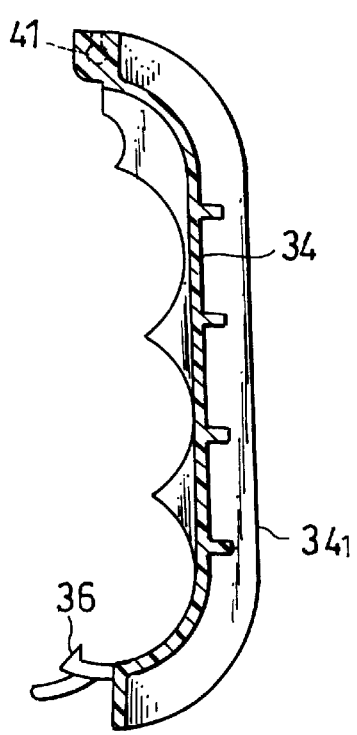
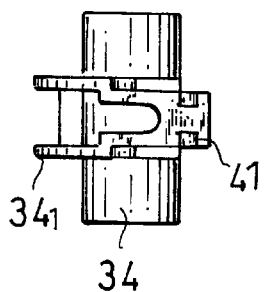

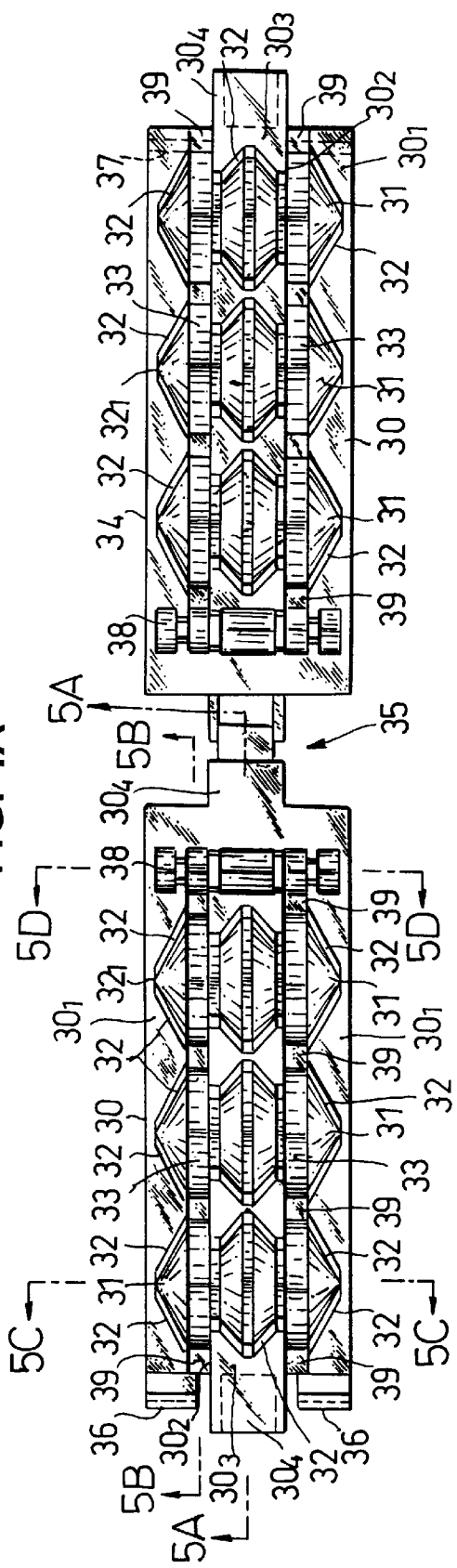

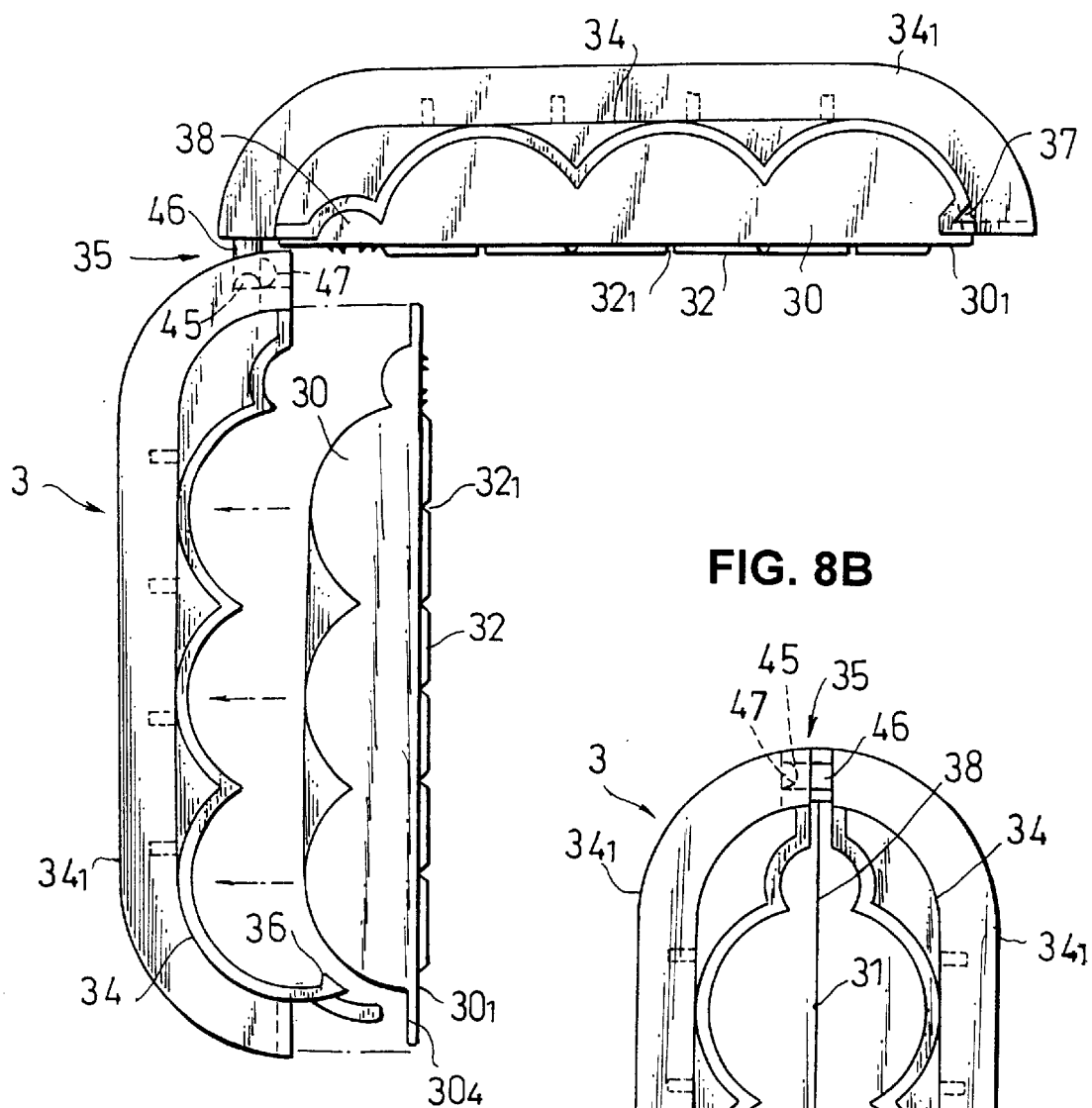
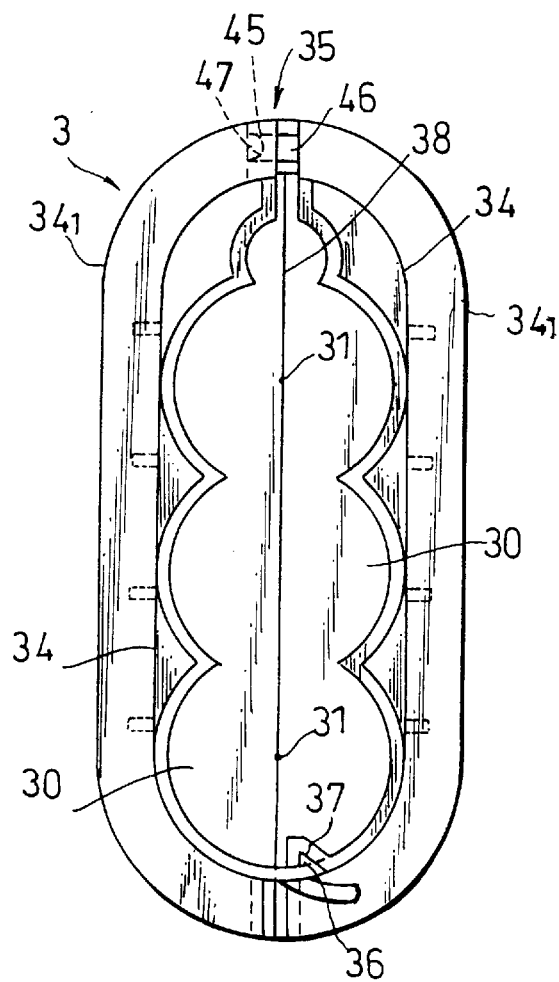
FIG. 8A
FIG. 8B

END SEAL STRUCTURE FOR CABLE CLOSURE

BACKGROUND OF THE INVENTION

This invention relates to an end seal structure for a cable closure, and more particularly to an end seal structure for a cable closure for protectively receiving a cable connection section at which connection or splicing, branching and wiring of communication cables such as optical fiber cables, metal cables or the like are carried out.

In general, a cable connection apparatus includes a receiving box for protectively enclosing a connection section of cables. The receiving box includes a vertically splittable cylindrical casing and end sections arranged on opposite ends of the cylindrical casing to close the casing. The cables are inserted through the end sections of the receiving box into the casing. The cylindrical casing is formed by securely connecting casing halves to each other using a fixing means while abutting parting faces of the casing halves against each other to airtightly or water-tightly hold the cable connection section including connectors in the cylindrical casing.

The end sections of the receiving box of the cable connection apparatus function to permit a cable, a support wire, an aerial cable and a trunk cable to be inserted therethrough to the cable connection section. For this purpose, the end section is formed with insertion holes. Such an end section of one type is so constructed that when a cable of a reduced diameter is inserted through one of such insertion holes previously provided through the end section and formed to have a size corresponding to a maximum diameter of cables applied, a suitable spacer or bushing is arranged in a gap formed between the insertion hole of the end section and the cable or a rubber tape of a predetermined thickness is wound on the cable having a reduced diameter, resulting in the gap being closed or filled up. This permits secure fitting of the cable in the end section. Additionally, a sealing tape of may be wound on the cable, to thereby ensure airtightness or water-tightness of the end section. An end section of another type is constructed in such a manner that tapered cylinders are provided on the end section so as to be cut in situ at predetermined portions thereof depending on diameters of cables applied. In either case, the end section is joinedly fixed at a predetermined portion thereof to the cable by means of a sealing tape, a PVC tape or the like.

As described above, in such conventional techniques of airtightly or water-tightly sealing the insertion holes for various cables different in diameter, a rubber tape, a sealing tape or the like is wound on an outer periphery of the cable to sealedly close the gap between the cable and the insertion hole. However, such a winding operation is troublesome. In particular, removal of the sealing tape and replacement thereof during installation of a new additional cable or maintenance of the cable are highly troublesome.

For example, an optical fiber cable includes a sheath having a support wire arranged in association with optical fibers and integrally covered together with connection elements or neck sections. Thus, separation of the connection element from the optical fiber cable by cutting causes the connection element to remain in the form of a strip-like projection or protrusion on the sheath of the optical fiber cable and the support wire, so that the strip-like projection often deteriorates sealing between the cable and the cable insertion hole when the cable is inserted through the insertion hole. Thus, winding of the sealing tape on the cable fails to effectively close or fill up a gap formed between the cable or support wire and the cable insertion hole, so that complete removal of the strip-like projection which is highly troublesome is necessarily required, leading to a deterioration in workability. Also, the cable to be applied is substantially varied in diameter, so that replacement of the tapered end section, rubber tape and the like is required, leading to time-consumption and an increase in repair cost.

Further, when the cable to be applied is a metal cable formed in a strand by twisting a number of metal wires together, it is formed on an outer periphery thereof with ruggedness, which causes gaps to occur between the cable and the insertion hole, leading to a deterioration in sealing function of the end seal structure in spite of use of the taping.

In addition, arrangement of the spacer or bushing between the cable and the cable insertion hole requires to prepare a number of spacers or bushings formed with cable insertion holes different in size so as to be accommodated to cables different in diameter.

SUMMARY OF THE INVENTION

The present invention has been made in view of the foregoing disadvantages of the prior art.

Accordingly, it is an object of the present invention to provide an end seal structure for a cable closure which is capable of attaining insertion of various cables different in diameter into a receiving casing for a cable connection without using any sealing tape.

It is another object of the present invention to provide an end seal structure for a cable closure which is capable of facilitating both assembling and disassembling of the end seal structure and therefore the cable closure, to thereby substantially reduce a period of time required for the assembling and disassembling.

It is a further object of the present invention to provide an end seal structure for a cable closure which is capable of being accommodated to both maintenance of a cable and installation of a new additional cable without requiring replacement of parts of the end seal structure while preventing an increase in cost therefor.

It is still another object of the present invention to provide an end seal structure for a cable closure which is capable of being simplified in structure and decreased in cost.

In accordance with the present invention, an end seal structure is provided for a cable closure including a cylindrical casing for enclosing a cable connection section and end wall portions integrally provided on opposite ends of the cylindrical casing and each formed therein with a fit groove which is positioned at a central portion thereof. The end seal structure includes a pair of end plates detachably fitted in the fit grooves of the cylindrical casing, respectively, wherein the end plates are each formed with at least one cable insertion passage through which a cable is inserted into the cylindrical casing. Each of the end plates includes a split cable spacer constructed in a manner to be splittable into two halves having abutting joint faces and arranged so as to be pressedly contacted with an outer periphery of the cable. The split cable spacer is made of a vulcanized rubber composition has at least one of hardness of 0 to 10 as measured according to JIS S 6050 and penetration of 40 to 90 ($10^{-1}$ mm) as measured according to JIS K 2560, and which is of 500 to 2000% in elongation and 10 to 60 kgf/cm$^2$ in tensile strength as measured according to JIS K 6301. The split cable spacer is integrally provided with a plurality of seal ribs, which are arranged along the cable insertion passage in a manner to be opposite to each other and spaced from each other at predetermined intervals. The seal ribs are each arranged in a manner to be operatively associated with an outer periphery of the cable when the cable is inserted through the cable insertion passage. Each of the end plates also includes a split end seal base provided with a hinge which permits the split end seal base to be pivotally split into two halves. The split cable spacer is fittedly held in the split end seal base, so that the halves of the split cable spacer may be detachably joined to each other through abutting joint faces thereof.

In a preferred embodiment of the present invention, the split cable spacer has an outer peripheral surface contoured in conformity to an inner peripheral surface of the seal base; the abutting joint faces of the halves of the split cable spacer are defined to be parallel to each other in a direction in which the cable is inserted through the split cable spacer; and the seal ribs are each formed to have a substantially chevron shape and arranged on the abutting joint faces in a manner to be opposite to each other while being spaced from each other in an axial direction of the cable.

In a preferred embodiment of the present invention, a plurality of cable insertion passages are arranged in the cable spacer in parallel with each other. In addition, a support wire insertion passage may be arranged in the cable spacer in parallel with the cable insertion passage.

In a preferred embodiment of the present invention, the split end seal base is constituted of a frame member constructed so as to be splitable at a central portion thereof into two halves in a longitudinal direction thereof; the hinge is mounted on one end of the frame member and includes a first member and a second member, the first member being provided on one end of one of the halves of the frame member and the second member being provided on one end of the other one of the halves of the frame member, the first and second members being detachably engaged with each other so that the halves of the frame member may be pivotally connected to each other through the hinge; and the frame member is provided at the other end thereof with a holding section which is constituted of a holding pawl and a receiving recess arranged opposite to the holding pawl so as to hold the holding pawl therein, so that the abutting joint faces of the halves of the cable spacer fittedly held in the halves of the frame member may be detachably joined to each other, to thereby define the cable insertion passage.

In a preferred embodiment of the present invention, the split seal base is formed on an outer peripheral surface thereof with strip-like projections fitted in the fit groove of the casing and on an inner peripheral surface thereof with ruggedness through which the split cable spacer is fittedly held in the split seal base; the split seal base is made of a synthetic resin material increased in hardness as compared with that of the split cable spacer; and the split cable spacer is provided with a plurality of recessed grooves arranged along the cable insertion passage to be spaced from each other.

In a preferred embodiment of the present invention, the first member of the hinge of the seal base includes a pair of support shafts arranged opposite to each other to be spaced from each other and the second member of the hinge includes a pair of substantially U-shaped grooves in which the support shafts are respectively fitted; and the support shafts are inserted through openings of the U-shaped grooves thereinto and pivotally moved 90 or 180 degrees, resulting in the hinge being assembled.

In a preferred embodiment of the present invention, the first member of the hinge of the seal base includes a pair of support shafts arranged opposite to each other to be spaced from each other and the second member of the hinge includes a pair of fit holes arranged so that the support shafts fit therein, respectively; and the support shafts are each formed on an outer periphery thereof with a holding rib and correspondingly the fit holes are each provided with a receiving recess for receiving the holding rib in such a manner that the fit hole is opposite to the holding rib.

In a preferred embodiment of the present invention, the first member of the hinge of the seal base includes a support shaft provided on an outer end thereof with a head increased in diameter and the second member of the hinge includes a connection element formed with a fit hole; the fit hole includes a large-diameter portion through which the head of the support shaft is inserted and a small-diameter portion; and the support shaft which is inserted through the large-diameter portion of the fit hole is moved to be fitted in the small-diameter portion of the fit hole, resulting in the hinge being assembled.

In a preferred embodiment of the present invention, the cable spacer includes a central wall between the recessed grooves; the seal ribs are projectedly provided at opposite ends of the abutting joint faces and on an abutting joint surface of the central wall of the cable spacer and arranged along the cable insertion passage to be spaced from each other; and the seal ribs are each formed to have a shape reduced in thickness at a distal end thereof so as to be deformed so that it may be inserted into a gap between the joint faces of the cable spacer and the cable to ensure satisfactory sealing properties when the cable is inserted through the cable insertion passage.

In a preferred embodiment of the present invention, the seal ribs are each formed so as to have an inclined face at the distal end thereof and are so arranged that the inclined faces of each pair of the seal ribs which are provided on the respective halves of the cable spacer and correspond to each other are opposite to each other while being rendered obliquely parallel to each other.

In a preferred embodiment of the present invention, the split cable spacer is provided on each of opposite end surfaces thereof with a recessed surface section which has a conical shape about the cable insertion passage.

In a preferred embodiment of the present invention, the holding section of the seal base includes an elastic element provided at a distal end thereof with the hook-like holding pawl; and the hook-like holding pawl and receiving recess of the holding section are arranged on respective free ends of the halves of the frame member opposite to the hinge to pressedly hold the cable spacer in the seal base.

In the end seal structure of the present invention thus constructed, a connection element arranged at a position on a cable sheath is cut to separate a support wire and the cable from each other and then the cable is subjected to a connection operation or a branching operation in the casing. Then, the seal base in which the cable spacer made of the vulcanized rubber composition is arranged is rendered opened about the hinge, resulting in the cable spacer being opened through the abutting joint faces, so that the cable is inserted along the cable insertion passage defined between the seal ribs into the casing. Subsequently, the holding pawl is engagedly fitted in the receiving recess to close the seal base, so that the cable is interposedly held between the halves of the cable spacer while ensuring positive sealing between the cable spacer and the cable by conforming of the seal ribs to the outer periphery of the cable.

Then, each end plate thus constituted by the seal base and the split cable spacer is fitted in the fit groove formed at the central portion of each of the end wall portions of the casing and the end wall portions of the casing are fitted on the end plates. Then, a lock mechanism provided at the casing is tightened to ensure sealing of the cable closure. The cable inserted through each of the end plates is pressedly contacted with the cable spacer.

Water possibly collected at the cable spacer is drained therefrom through a drainage mechanism constituted by gaps communicating with the recessed grooves arranged adjacently to the seal ribs, as required. Also, when the end seal structure of the present invention, as described above, is constructed in the manner that the split seal base is constituted of the frame member constructed so as to be split at a central portion thereof into two halves in a longitudinal direction thereof and the hinge is mounted on one end of the frame member so that the halves of the frame member may be pivotally connected to each other through the hinge, it facilitates operation of inserting the cables therethrough into the casing while ensuring positive holding of the split cable spacer and exhibiting a highly increased sealing function.

Thus, the present invention permits the cable and support wire to be pressedly contacted with the cable spacer while positioning the cable and support wire along the abutting joint faces of the halves of the cable spacer, resulting in attaining installation of a new additional cable and maintenance of the cable with a reduced cost and without replacement of parts of the end seal structure.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 3A is a left side elevation view showing a part of a seal base incorporated in the end seal structure shown in FIG. 1;

FIG. 3B is a front elevation view of the seal base shown in FIG. 3A;

FIG. 3C is a right side elevation view of the seal base shown in FIG. 3A;

FIG. 3D is a central vertical sectional view of the seal base shown in FIG. 3A;

FIG. 3E is a plan view of the seal base shown in FIG. 3A;

FIG. 4A is a plan view showing a cable spacer incorporated in the end seal structure shown in FIG. 1 while it is opened;

FIG. 4B is a perspective view showing a part of the cable spacer of FIG. 4A;

FIG. 8A is a front elevation view showing another embodiment of an end seal structure according to the present invention while the end seal structure is opened;

FIG. 8B is a front elevation view showing the end seal structure of FIG. 8A while it is closed;

DETAILED DESCRIPTION OF THE PREFERRED EMBODIMENTS

Figure 1:
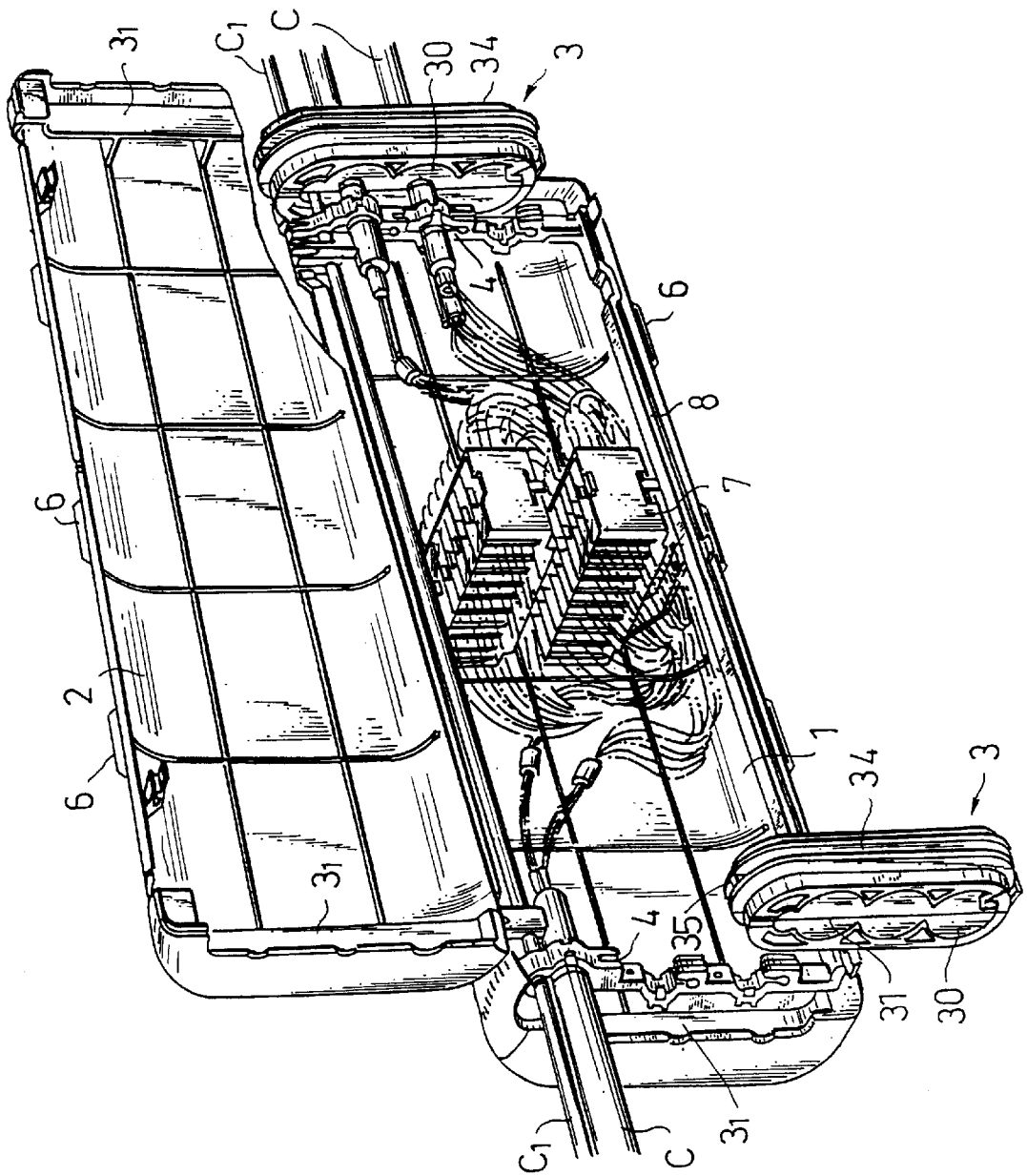
FIG. 1 is a partially exploded perspective view showing a cable closure in which an embodiment of an end seal structure according to the present invention may be incorporated by way of example while the cable closure is opened.
Figure 2A:
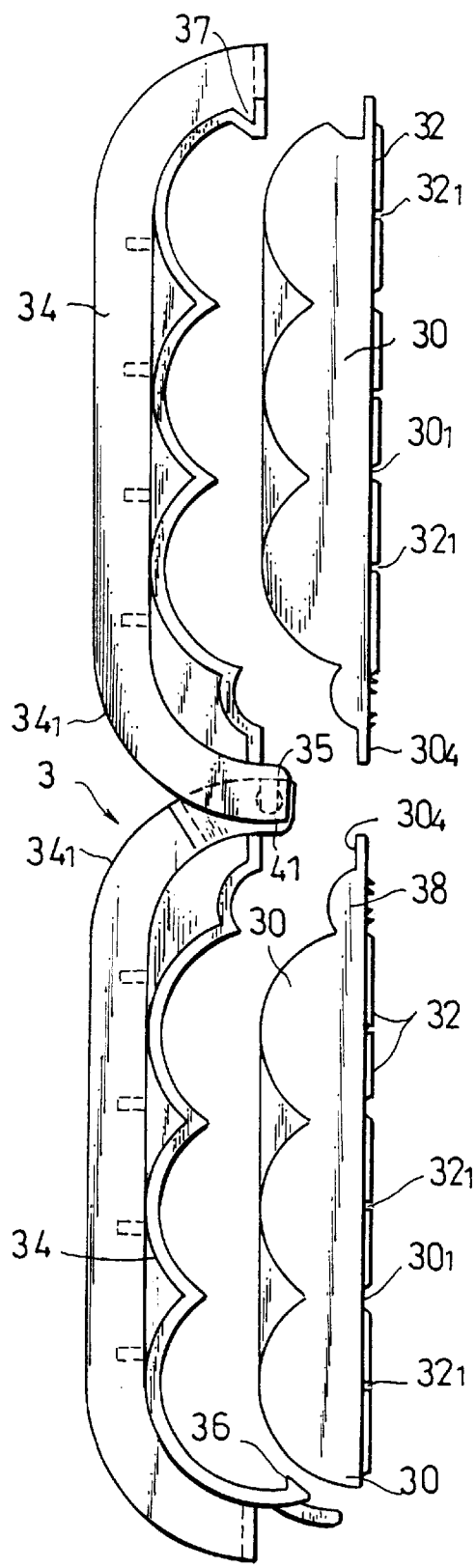
FIG. 2A is a front elevation view showing the end seal structure of FIG. 1 while it is opened.
Figure 2B:
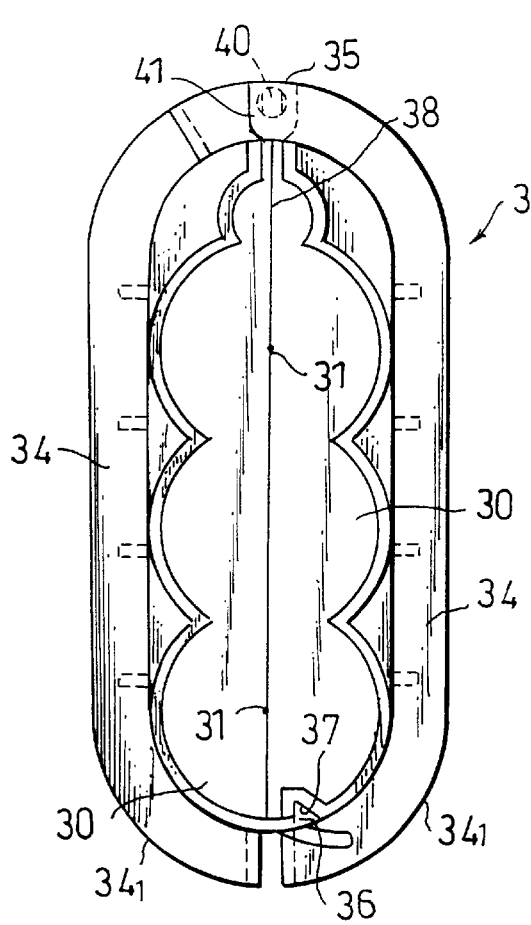
FIG. 2B is a front elevation view showing the end seal structure of FIG. 1 while it is closed.
Figure 2C:
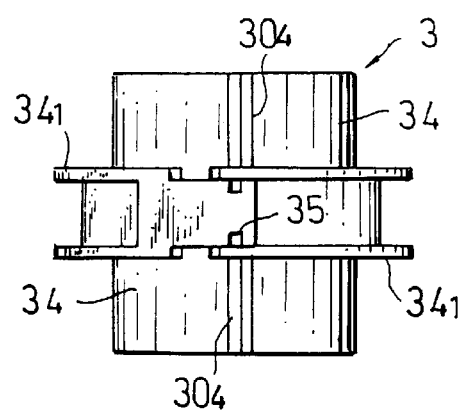
FIG. 2C is a plan view of the end seal structure shown in FIG. 1.
Figure 5A:
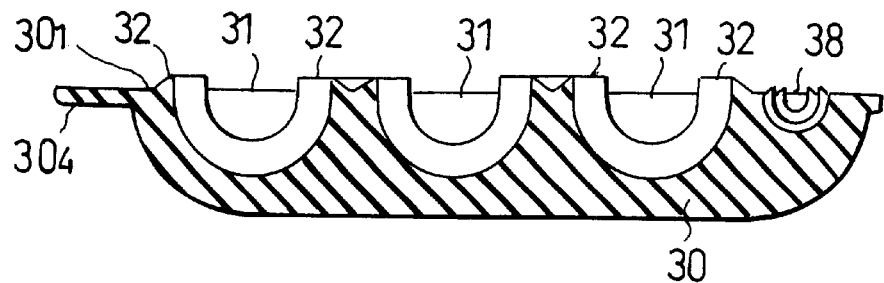
FIG. 5A is a vertical sectional view taken along line 5A—5A of FIG. 4A.
Figure 5B:
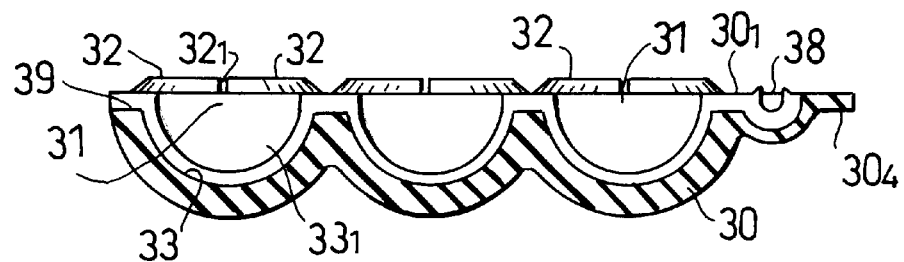
FIG. 5B is a vertical sectional view taken along line 5B—5B of FIG. 4A.
Figure 5C:
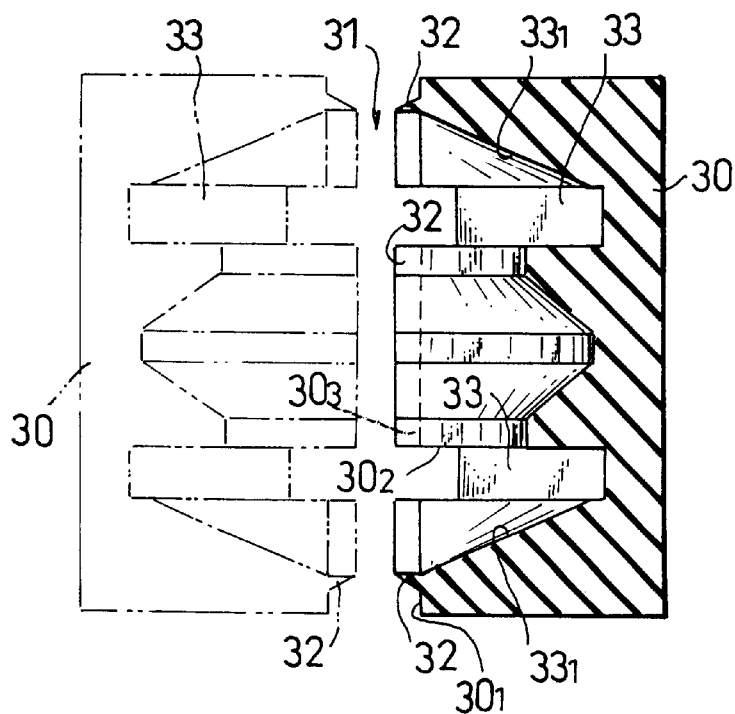
FIG. 5C is an enlarged front elevation view in section taken along line 5C—5C of FIG. 4A.
Figure 5D:
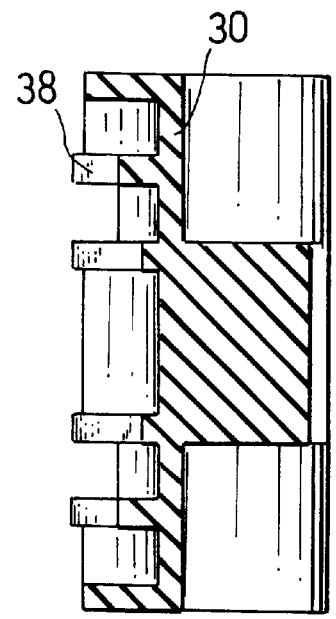
FIG. 5D is an enlarged front elevation view in section taken along line 5D—5D of FIG. 4A.

Now, an end seal structure for a cable closure according to the present invention will be described hereinafter with reference to the accompanying drawings.

Referring first to FIGS. 1 to 7, an embodiment of an end seal structure for a cable closure according to the present invention is illustrated. An end seal structure of the illustrated embodiment is adapted to be applied to a cable closure including a cylindrical casing for enclosing a cable connection section such as a connection section of optical fiber cables, which casing is constructed so as to be splittable into two casing parts 1 and 2. In the illustrated embodiment, the casing is adapted to be split into two halves. Also, the cable closure includes end wall portions integrally provided on opposite ends of the cylindrical casing and each formed therein with a fit groove $3_1$ so as to be positioned at a central portion thereof, as well as a pair of end plates or end seal structures 3 each detachably fitted in a respective one of the fit grooves $3_1$ of the cylindrical casing and constructed so as to permit one or more cables C and a support wire $C_1$ to be inserted therethrough into the cylindrical casing and therefore the cable closure. For this purpose, the end seal structures 3 are each formed with one or more cable insertion passages 31 through which the cables C are inserted into the cable closure and a support wire insertion passage 38 through which the support wire $C_1$ is inserted into the cable closure.

The end seal structure 3 of the illustrated embodiment includes a split cable spacer 30 constructed in a manner to be splittable into two parts and arranged so as to be pressedly contacted with outer peripheries of the cables C and support wire $C_1$. In the illustrated embodiment, the split cable spacer 30 is constructed so as to be pivotally split into two halves. The cable spacer 30 is made of a vulcanized rubber composition which has hardness of 0–10 as measured according to JIS S 6050 and/or penetration of 40–90 ($10^{-1}$ mm) as measured according to JIS K 2560, and which is of 500–2000% and preferably 1000–2000% in elongation and 10–60 kgf/cm² in tensile strength as measured according to JIS K 6301. The halves of the split cable spacer 30 are each integrally provided with a plurality of seal ribs 32, which are arranged along the cable insertion passages 31 in a manner to be opposite to each other and spaced from each other in an axial direction of the cable insertion passages 31 at predetermined intervals. The seal ribs 32 are each provided on at least one side thereof with a recessed groove 33 of a semicylindrical shape. The halves of the cable spacer 30 are each provided with gaps or slits 39 in a manner to communicate with the recessed grooves 33 at outer peripheries thereof to constitute a drainage mechanism for draining water from the cable spacer 30. The end seal structure 3 also includes a split end seal base 34 having the split cable spacer 30 fitted therein and provided with a hinge 35 which permits the split cable spacer 30 to be split into the two halves, so that the two halves of the split cable spacer 30 are detachably joined to each other through abutting joint faces $30_1$ thereof. In addition, seal ribs may also be provided along the support wire insertion passage 38.

The split cable spacer 30 has an outer peripheral surface contoured in conformity to an inner peripheral surface of the seal base 34. The abutting joint faces $30_1$ of the two halves of the split cable spacer 30 are formed in a manner to be parallel to each other in a direction in which the cables C and support wire $C_1$ are inserted through the split cable spacer 30. Each pair of the seal ribs 32 disposed at the opposite ends of the halves of the cable spacer 30 are each arranged in a chevron shape and are formed with a slit $32_1$ which permits the cable C to be inserted through the seal ribs 32. Each pair of the seal ribs 32 are arranged on the abutting joint faces $30_1$ in a manner to be opposite to each other while interposing an axis of the cable C, as shown in FIG. 4A.

A support wall $30_2$ is arranged between the recessed grooves 33 and formed with cavities which have a cylindrical shape with cones at opposite sides thereof in a manner to correspond to the cable insertion passages 31. In addition, the cable spacer 30 is formed on an inner surface of each of the recessed grooves 33 with a conical or frust-conical recessed surface section $33_1$ about a respective one of the cable insertion passages 31. The support wall $30_2$ is provided with an abutting joint surface $30_3$, which is projectedly provided with seal ribs 32. Such construction permits a plurality of seal faces to be formed on an inside of the split cable spacer 30 in a direction of thickness thereof or an axial direction of the cable C, resulting in the split cable spacer 30 exhibiting an enhanced seal function when the cable or cables C are interposedly held therebetween.

In the illustrated embodiment, the end seal structures 3, as shown in FIGS. 2A to 5D, are each constituted by the split cable spacer 30 of which the two parts or halves are each provided with the abutting joint face $30_1$ and the split end seal base 34 in which the split cable spacer 30 is fittedly held, wherein the cable insertion passages 31 through which the cables C are respectively inserted into the cylindrical casing are arranged in a thickness direction of each of the end seal strucures 3. Also, in the illustrated embodiment, the split seal base 34 is constituted of a frame member constructed so as to be splitable at a central portion thereof into two parts or halves in a longitudinal direction thereof. In this instance, the hinge 35 is detachably connected to one end of each of the halves of the frame member or split seal base 34 so that the halves of the split seal base 34 may be pivotally connected to each other through the hinge 35. The other end of each of the halves of the split seal base 34 is provided with a holding section constituted of a holding pawl 36 and a receiving portion or recess 37 arranged opposite to the holding pawl 36 so as to fittedly hold the holding pawl 36 therein. Such construction permits the abutting joint faces $30_1$ of the halves of the cable spacer 30 fittedly held in the halves of the seal base 34 to be detachably joined to each other, to thereby form the cable insertion passages 31 and support wire passage 38.

The end wall portions integrally formed on the opposite ends of the cylindrical casing constituted of the casing parts or halves 1 and 2, as described above, are each provided at the central portion thereof with the fit groove $3_1$, in which the end seal structure 3 through which the cables C are inserted is detachably fitted through the seal base 34. The split cable spacer 30 arranged in the seal base 34 is made of a vulcanized rubber composition and formed with a plurality of the recessed grooves 33 in a manner to be spaced from each other at predetermined intervals in the direction of insertion of the cables C. Between the recessed grooves 33 is arranged the partition wall or support wall $30_2$, which is integrally provided on the surface $30_3$ thereof with the seal ribs 32 in a manner to be projected therefrom. The split seal base 34 is formed on an outer peripheral surface thereof with strip-like projections $34_1$ fitted in the fit groove $3_1$ of the casing and on an inner peripheral surface thereof with ruggedness through which the cable spacer 30 is fittedly held in the split seal base 34 using any suitable fixing means such as an adhesive or the like. The split seal base 34 is made of a synthetic resin material increased in hardness as compared with that of the split cable spacer 30. For example, it may be made of a synthetic resin material of 40 to 90 in hardness.

Figure 6A:
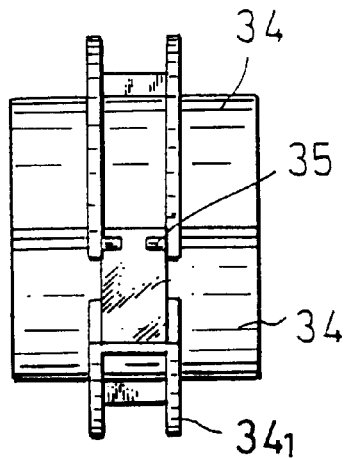
FIG. 6A is a plan view showing a hinge arranged in the seal base shown in FIG. 3A.
Figure 6B:
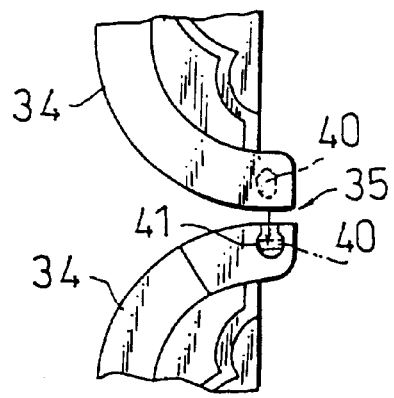
FIG. 6B is a front elevation view of the hinge shown in FIG. 6A while it is opened.
Figure 6C:
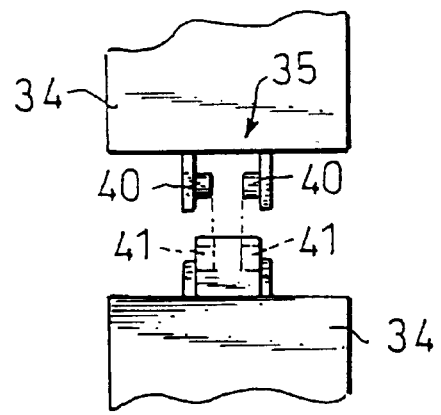
FIG. 6C is a plan view of the hinge shown in FIG. 6A.

The hinge 35 of the seal base 34, as shown in FIGS. 6A to 6C, includes a pair of support shafts 40 arranged opposite to each other while being spaced from each other and a pair of substantially U-shaped grooves 41 in which the support shafts 40 are respectively fitted. The support shafts 40 are respectively inserted through openings of the U-shaped grooves 41 thereinto and pivotally moved by an angle of 90 or 180 degrees, resulting in constituting the hinge 35.

The seal ribs 32 are projectedly provided at the opposite ends of the joint face $30_1$ and on the joint surface $30_3$ of the support wall $30_2$ of each half of the cable spacer 30 and arranged along the cable insertion passages 31 while being spaced from each other. The seal ribs 32 thus arranged are each formed to have a shape reduced in thickness at a distal end thereof so that it may be resiliently deformed and inserted into a gap between each of the abutting joint faces of the cable spacer 30 and the cable C to ensure a satisfactory sealing function when the cable C is inserted through the cable insertion passage 31. Also, the seal base 34, as described above, includes the holding section which is constituted by an elastic element provided at the distal end thereof with the hook-like holding pawl 36 and the receiving recess 37 in which the hook-like holding pawl 36 of the elastic element is fittedly received. The holding section is arranged on the free end of the split seal base 34 opposite to the hinge 35 to pressedly hold the cable spacer 30 in the seal base 34.

The cylindrical casing constituted by the casing parts or halves 1 and 2 is formed to have a circular shape in section or a rectangular shape in section and includes the end wall portions each provided with the fit groove $3_1$ in which the end seal structure 3 is fitted. The cylindrical casing is constructed so as to be split into the two parts or halves 1 and 2, which are connected to each other by mating abutting joint faces thereof with each other, so that the end seal structures 3 may be integrally mounted therein while providing enhanced sealing properties between the outer peripheries thereof and the cylindrical casing. Also, the cable insertion passages 31 for optical fiber cables, aerial cables and/or trunk cables which are formed through each of the end seal structures 3 and the support wire insertion passage 38 which is likewise formed therethrough are arranged on the abutting joint faces $30_1$ of the cable spacer 30, to thereby facilitate insertion of the cables C and support wire $C_1$ and provide satisfactory sealing properties after the insertion.

The seal ribs 32 formed on the cable spacer 30, as shown in FIGS. 4A and 4B, are arranged along the cable insertion passages 31 and spaced from each other at intervals in an axial direction of the cables C as required, resulting in exhibiting a gasket function. The seal ribs 32 are continuously or successively provided on the abutting joint faces $30_1$ of the cable spacer 30 in a manner to be projected therefrom and are so arranged that distal ends thereof are formed so as to have inclined faces and the inclined faces of the seal ribs 32 are arranged opposite to each other while being rendered parallelly engaged with each other when the halves of the cable spacer 30 are abutted against each other, to thereby ensure satisfactory sealing of the cable insertion passages 31 and support wire insertion passage 38.

In the illustrated embodiment, the cable spacer 30 is made of low-hardness (hardness: 0 to 10) rubber increased in elongation and modulus. The rubbers include vulcanized rubber compositions of 40 to 90 and preferably 50 to 70 in penetration ($10^{-1}$ mm) as measured according to JIS K 2560, 500 to 2000%, preferably 1000 to 2000% and more preferably 1500 to 1900% as measured according to JIS K 6301 in elongation, and 100%—0.5 kgf/cm$^2$, 300%—1.0 kgf/cm$^2$ and 400%—1.4 kgf/cm$^2$ as measured according to JIS K 6301 in modulus such as, for example, ethylene-propylene rubber (EPR), ethylene-propylene-diene-methylene rubber (EPDM), silicone rubber (Q), butyl rubber (IIR), styrene-butadiene rubber (SBS), fluororubber (FKM) and the like. More specifically, the rubbers include vulcanized rubber compositions of 1.0 to 1.05 in specific gravity, 10 to 60 kgf/cm$^2$, for example, 31 kgf/cm$^2$ in tensile strength and 50 to 80%, for example, 63.0% in compression set (70° C.×22H). Such rubber compositions permit the cable spacer 30 to be subject to elastic deformation, to thereby accomplish close or tight contact with the cables or support wire without any gap, resulting in ensuring drip-proofness, even when any protrusion of the connection element remains on the support wire or a sheath of the cable or the cable is a twisted metal cable provided thereon with irregularities. For this purpose, a vulcanized rubber composition such as EPR or EPDM containing 100 parts by weight of polymer, 100 to 300 parts by weight of petroleum softener (process oil) and 50 parts by weight or more of polybutene is preferably used as the low-hardness rubber.

The seal ribs 32 arranged on the cable spacer 30 are formed to be continuously linear in an axial direction thereof or to have a curved shape such as a rugged shape, a Z-like shape, an S-like shape, an Ω-like shape or the like in the axial direction.

The seal ribs 32 may be arranged so as to be closely contacted with the cable C. Alternatively, they may be arranged in a manner to form a slight gap therebetween so long as surfaces thereof in the axial direction is closely contacted with the cable C. In any event, such arrangement of the seal ribs 32 enhances a sealing function of the end seal structure.

The cable spacer 30 is arranged so as to occupy a large part of each of the abutting joint faces of the end seal structure 3. For example, the cable spacer 30 may be arranged so as to be projected from the seal base 34 and a plate-like element $30_4$ formed by extending a part of the cable spacer 30 may be arranged at an abutting portion of the holding section and the hinge 35 so as to act as an lateral end seal rubber member, resulting in enhancing a sealing function of the end seal structure 3. The plate-like element $30_4$ may be formed on each of opposite sides thereof with a cutout as required, to thereby permit water in the recessed grooves 33 of the cable spacer 30 to be readily outwardly drained therethrough. The cable C such as trunk optical fiber cable is inserted through the end seal structure 3 while being interposedly held by the halves of the cable spacer 30 and then securely held by a cable clamp 4 arranged in the cylindrical casing. A tension member of the cable C is connected to a tension member clamp of a support clamp means and the support wire $C_1$ is fixed to a support wire clamp. Such clamps are received in the casing while being integrally mounted on the casing by means of a connection fitment 8.

Figure 7:
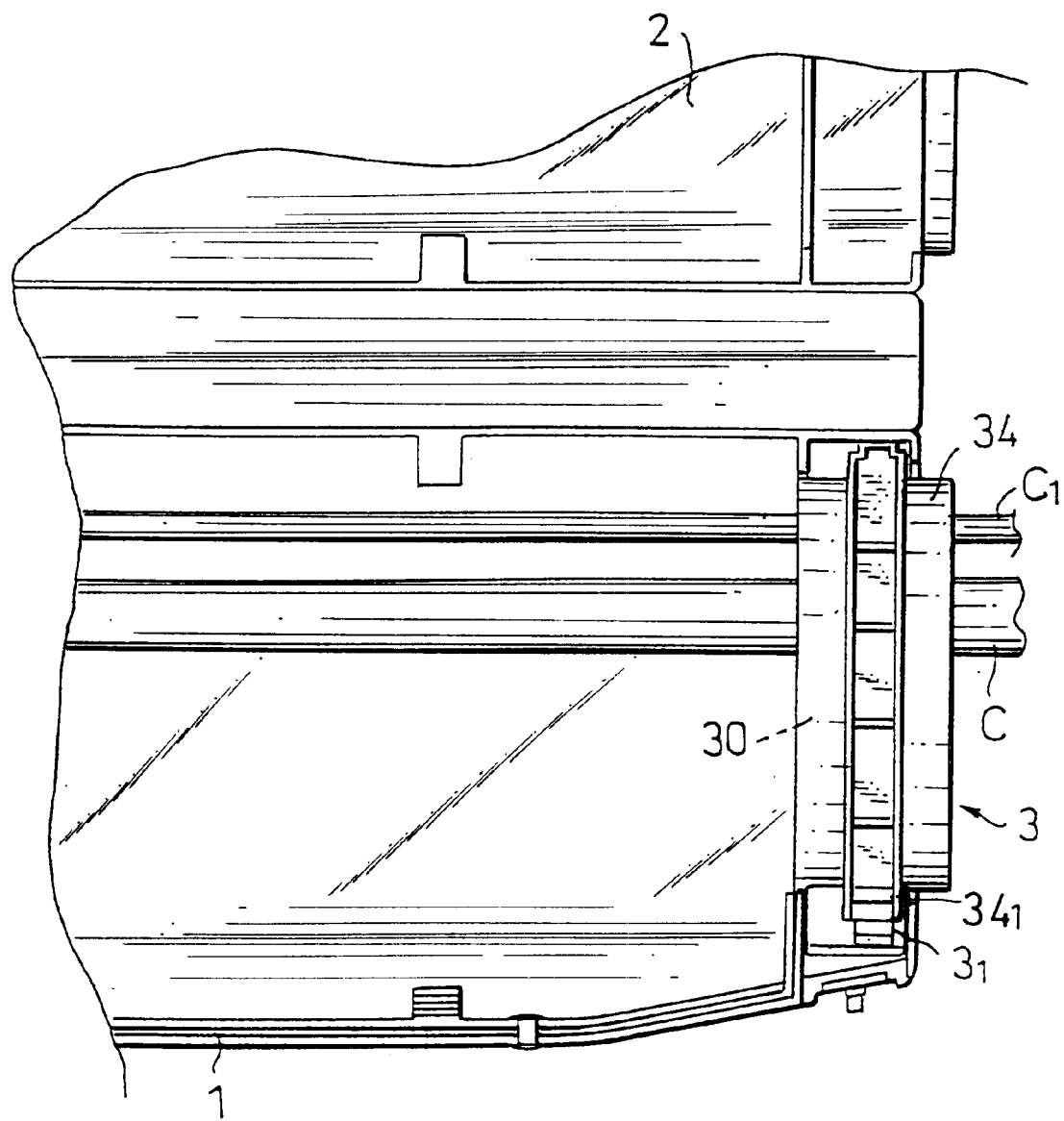
FIG. 7 is a side elevation view showing the end seal structure shown in FIG. 1 in use while the cable closure is opened.
Figure 9A:
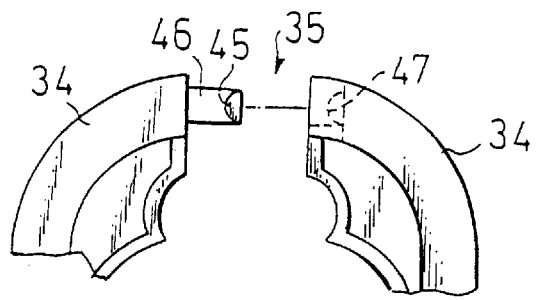
FIG. 9A is a fragmentary front elevation view showing a seal base incorporated in the end seal structure shown in FIG. 8A and a hinge arranged in the seal base.
Figure 9B:
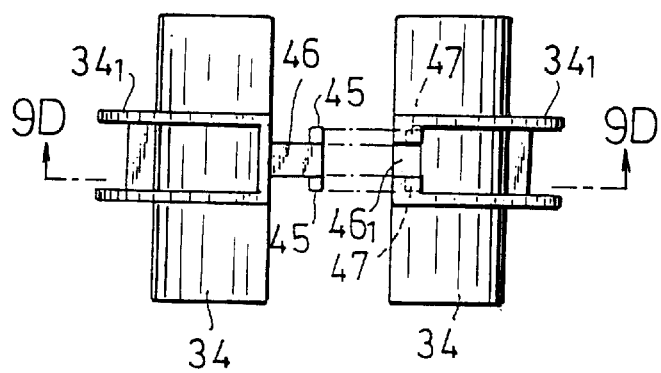
FIG. 9B is a plan view of the seal base and hinge shown in FIG. 9A.
Figure 9C:
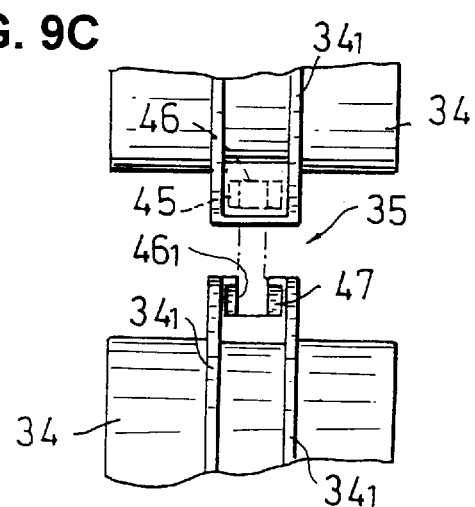
FIG. 9C is a side elevation view of the seal base and hinge prior to assembling of the hinge.
Figure 9D:
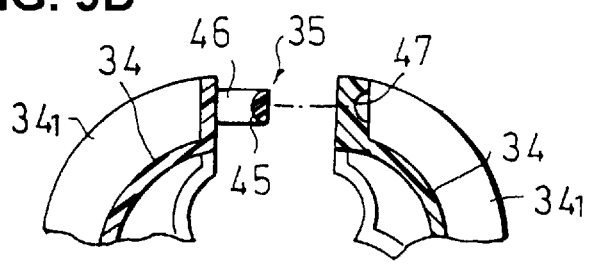
FIG. 9D is a vertical sectional view taken along line 9D—9D of FIG. 9B.
Figure 10A:
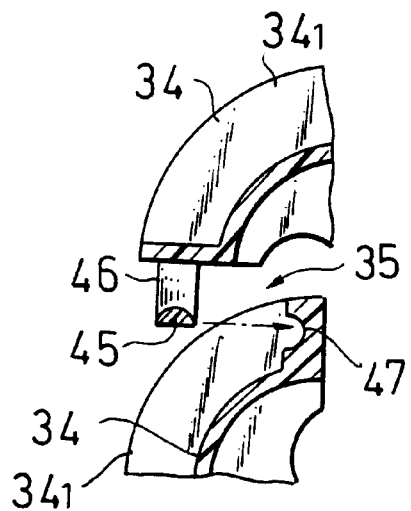
FIG. 10A is a vertical sectional view of the hinge shown in FIG. 9A prior to assembling thereof.
Figure 10B:
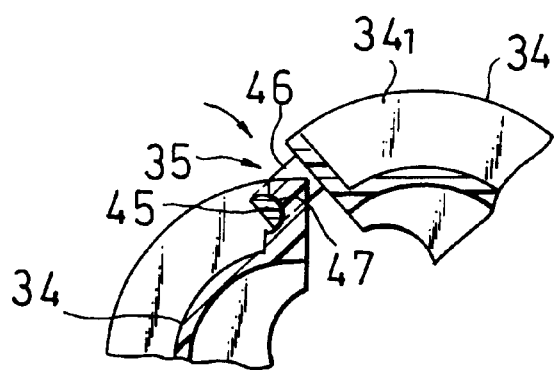
FIG. 10B is a vertical sectional view of the hinge shown in FIG. 9A during pivotal movement thereof for assembling thereof.
Figure 10C:
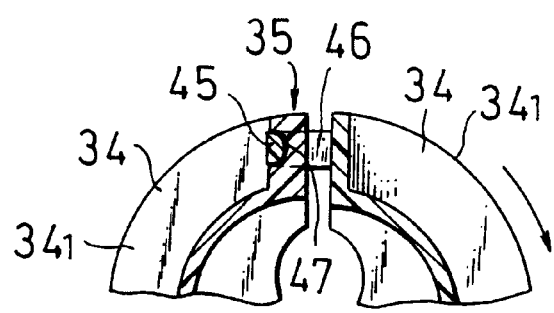
FIG. 10C is a vertical sectional view showing the hinge of FIG. 9A after it is assembled.
Figure 11A:
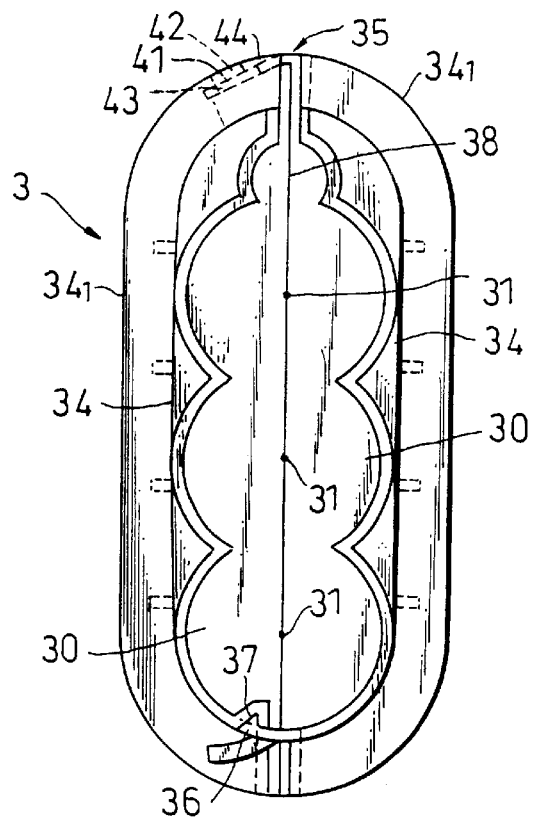
FIG. 11A is a front elevation view showing a further embodiment of an end seal structure according to the present invention.
Figure 11B:
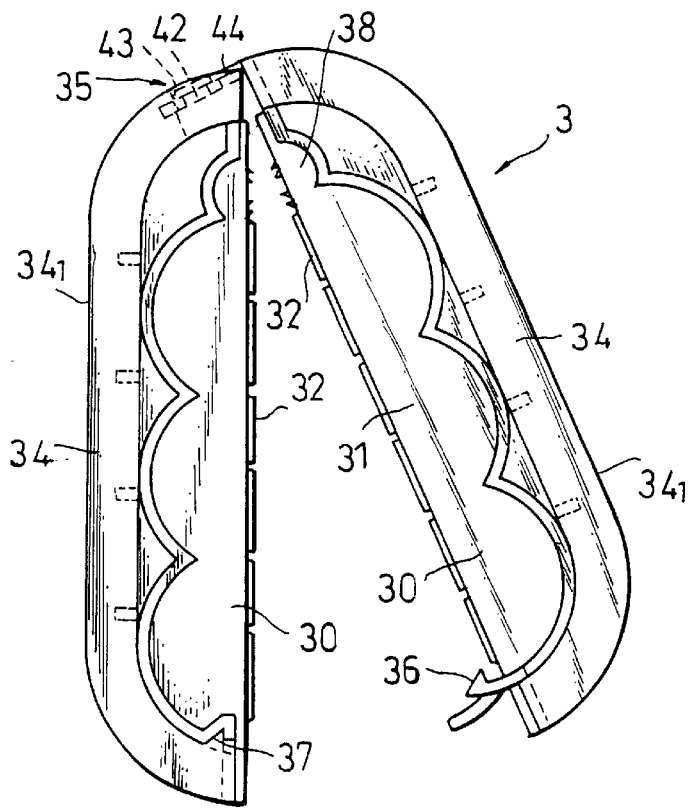
FIG. 11B is a front elevation view of the end seal structure shown in FIG. 11A while it is partially opened.
Figure 12A:
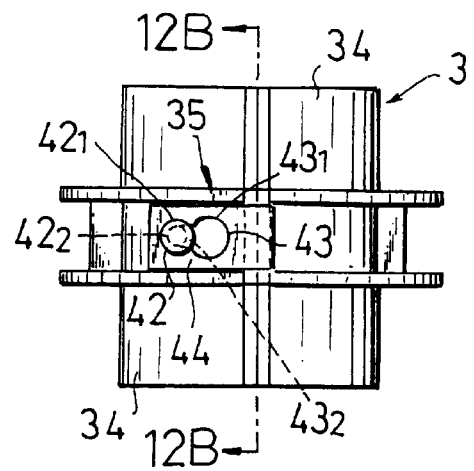
FIG. 12A is an enlarged plan view showing the end seal structure of FIG. 11A.
Figure 12B:
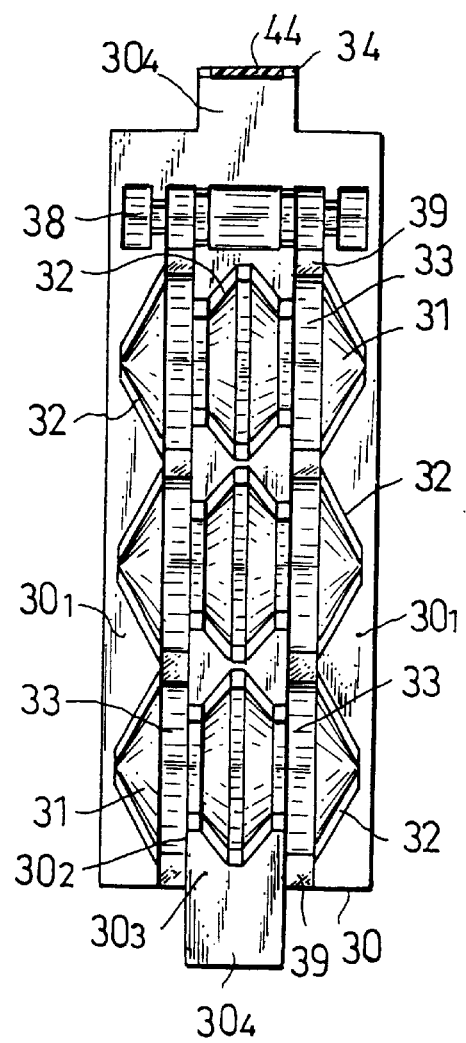
FIG. 12B is a side elevation view taken along line 12B—12B of FIG. 12A.
Figure 13A:
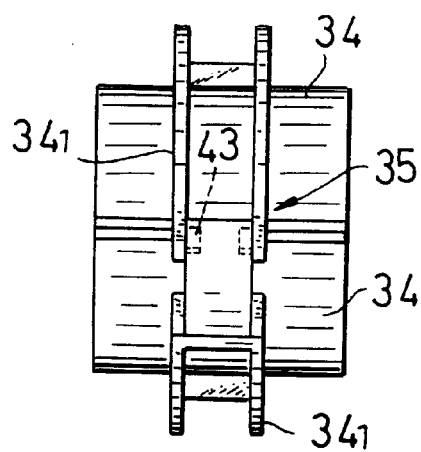
FIG. 13A is a plan view showing a hinge arranged in a seal base incorporated in still another embodiment of an end seal structure according to the present invention while it is closed.
Figure 13D:
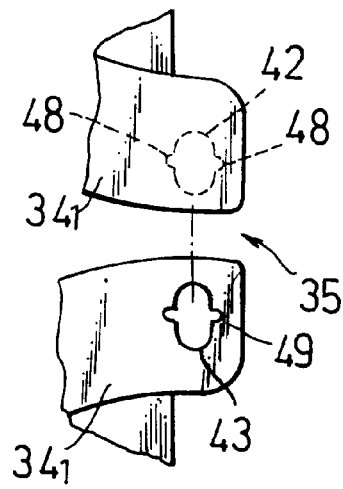
FIG. 13D is an enlarged side elevation view showing the hinge of FIG. 13A.
Figure 13B:
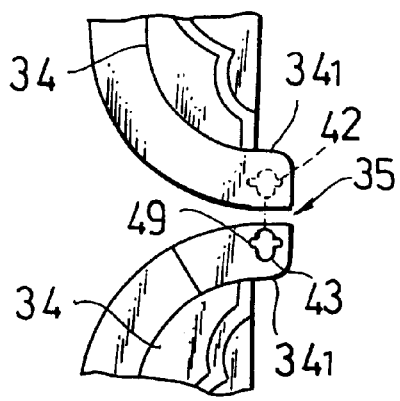
FIG. 13B is a side elevation view of the hinge shown in FIG. 13A while it is opened.
Figure 13E:
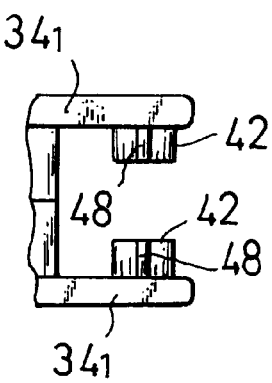
FIG. 13E is an enlarged plan view showing a part of the hinge of FIG. 13A.
Figure 13C:
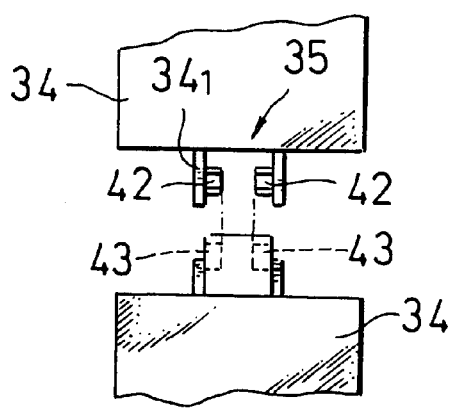
FIG. 13C is a front elevation view of the hinge shown in FIG. 13A.
Figure 14A:
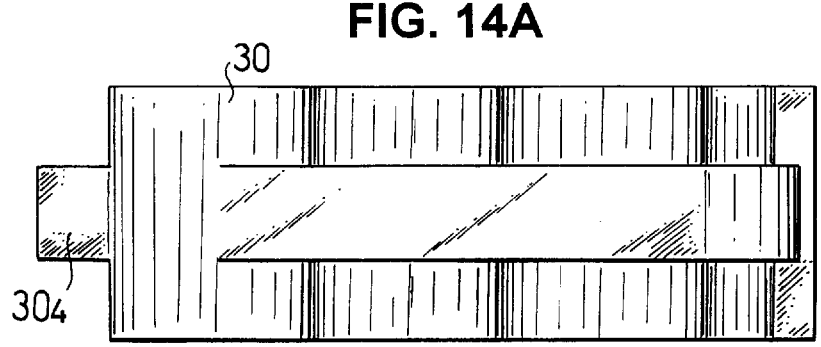
FIG. 14A is a view showing a front side of a cable spacer incorporated in yet another embodiment of an end seal structure according to the present invention.
Figure 14B:
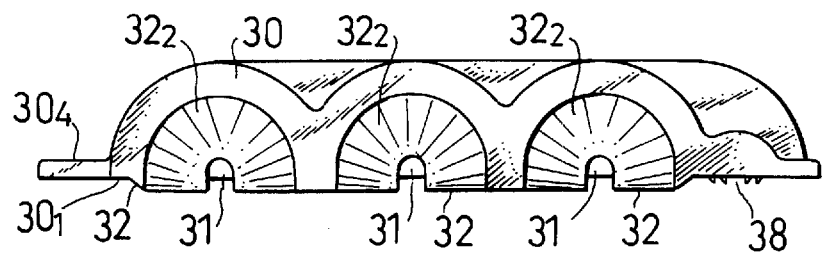
FIG. 14B is a side view of the cable spacer shown in FIG. 14A.
Figure 14C:
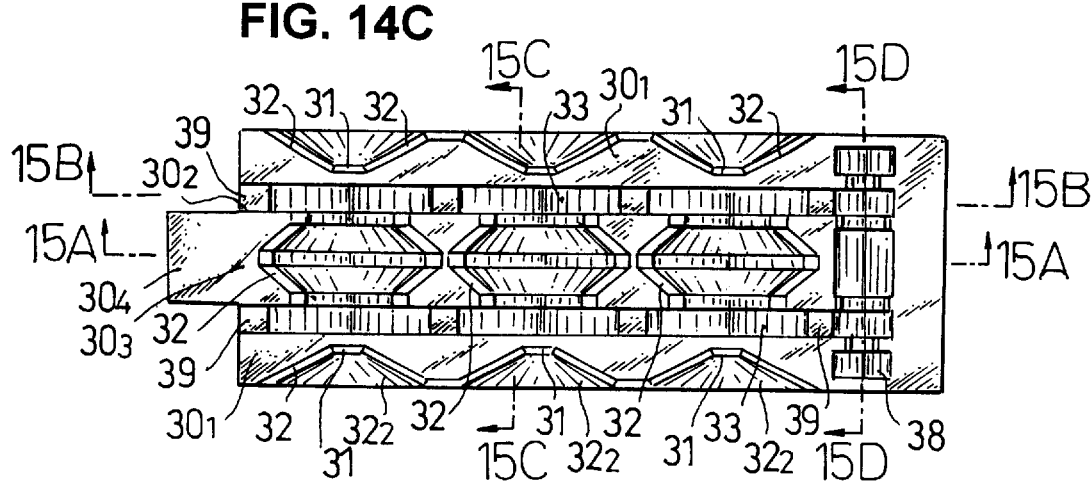
FIG. 14C is a view showing an inner side of the cable spacer of FIG. 14A.
Figure 14D:
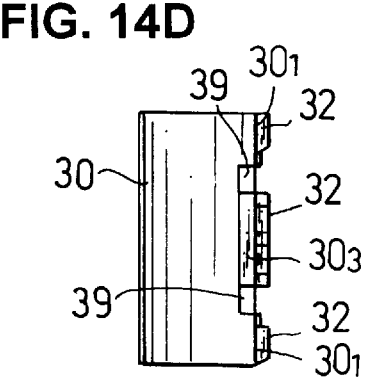
FIG. 14D is a front view of the cable spacer shown in FIG. 14A.
Figure 14E:
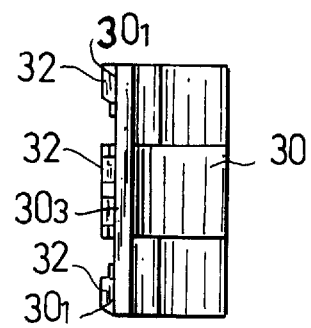
FIG. 14E is a rear view of the cable spacer shown in FIG. 14A.
Figure 15A:
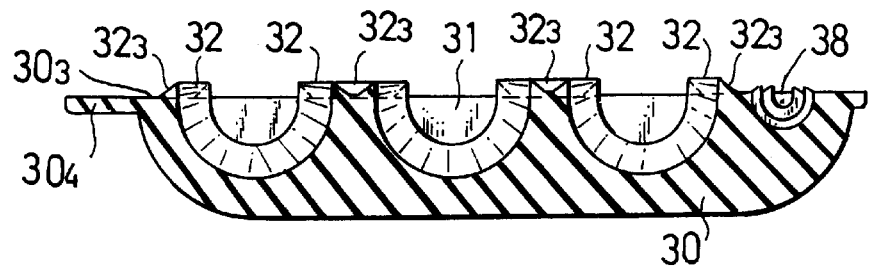
FIG. 15A is a vertical sectional view taken along line 15A—15A of FIG. 14C.
Figure 15B:
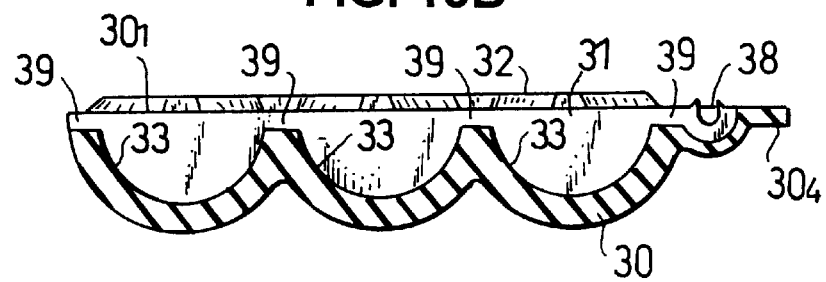
FIG. 15B is a vertical sectional view taken along line 15B—15B of FIG. 14C.
Figure 15C:
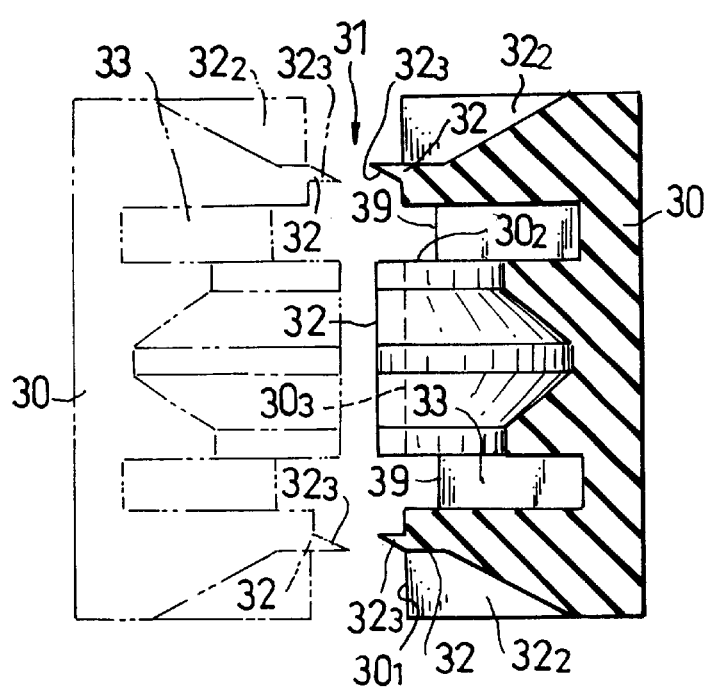
FIG. 15C is an enlarged front elevation view in section taken along line 15C—15C of FIG. 14C.
Figure 15D:
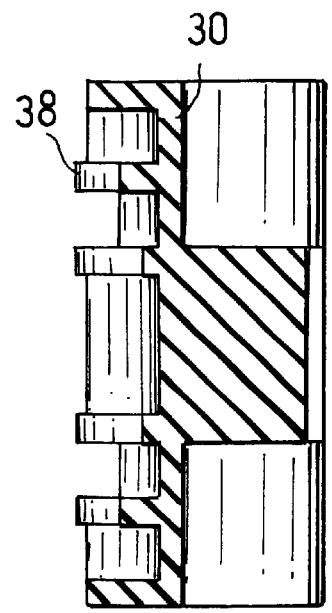
FIG. 15D is an enlarged front elevation view in section taken along line 15D—15D of FIG. 14C.

The split cylindrical casing is constructed in the form of a cylindrical shape so as to be splittable into the two halves 1 and 2 along the abutting joint faces in the axial direction thereof. The cylindrical casing may be made of synthetic resin such as, for example, polypropylene (PP) resin, fire-retardant FRPP or the like. Thus, the cylindrical casing includes the abutting joint faces through which the casing is split into the halves 1 and 2 longitudinally in the axial direction thereof. The cylindrical casing is provided on the opposite ends thereof with the end seal structures 3 so as to insert the cables C therethrough into the casing and in a manner to permit the cable connection section to be arranged therebetween. The end seal structures 3 are securely fitted in the end wall portions of the cylindrical casing by means of tightening lock holders 6. One of the casing halves of the cylindrical casing which is designated at reference numeral 1 is provided therein with fiber storage trays 7 including the cable connection section and an excessive fiber receiver, as shown in FIGS. 1 and 7.

The support wire insertion passage 38 and cable insertion passages 31 are permitted to communicate with each other through the abutting joint faces $30_1$, so that the end seal structure of the illustrated embodiment may be applied to both a cable of the type that a support wire and a cable are continuously connected through a covering material and a cable of the type that a support wire and a cable are intermittently connected to each other at intervals by means of connection elements. Also, the end seal structure 3 of the illustrated embodiment is constructed so as to permit the support wire insertion passage 38 and cable insertion passages 31 to be accommodated to various cables different in diameter.

In the embodiment shown in FIGS. 2A to 3E, the hinge 35 arranged at one end of the seal base 34 is assembled due to rotation by 180 degrees. More specifically, the support shaft 40 is vertically inserted through the opening of the U-shaped groove 41 thereinto and then one of the halves of the seal base 34 is rotated 180 degrees, so that the holding pawl 36 may be fitted in the receiving recess 37. This results in the halves of the cable spacer 30 being abuttedly joined together while minimizing a gap therebetween, to thereby ensure a satisfactory sealing function of the end seal structure 3. At this time, the cable spacer 30 may be suitably deformed depending on a diameter of the cable C, to thereby be tightly contacted with the cable C. Further, insertion of the cable C is facilitated by opening the seal base 34 to open the cable spacer 30.

Referring now to FIGS. 8A to 10C, another embodiment of an end seal structure according to the present invention is illustrated. In an end seal structure 3 of the illustrated embodiment, a hinge 35 provided at one end of a seal base 34 includes a connection rod 46 provided on both sides thereof with support shafts 45 of a semicircular shape in section in a manner to be projected therefrom and a receiving recess 47 having an arcuate recessed surface for the support shafts 45 and provided with a slit $46_1$ for inserting the connection rod 46 therethrough into the receiving recess 47. When the connection rod 46 is horizontally inserted through the slit $46_1$ of the receiving recess 47 so as to engage the support shafts 45 with the receiving recess 47 and then one of halves of the seal base 34 is rotated 90 degrees, a holding pawl 36 is fitted in a receiving recess 37, so that halves of a split cable spacer 30 may be abuttedly joined to each other while keeping abutting joint faces thereof closely contacted with each other, resulting in a satisfactory sealing function being exhibited. The split cable spacer 30 is constructed so as to be suitably deformed depending on a diameter of a cable applied, to thereby be tightly contacted with the cable.

Referring now to FIGS. 11A to 12B, a further embodiment of an end seal structure according to the present invention is illustrated. In an end seal structure 3 of the illustrated embodiment, a hinge 35 arranged at one end of a seal base 34 includes a support shaft 42 provided with a head $42_1$ and a neck $42_2$ and a connection element 44 provided with a fit hole 43 in which the support shaft 42 is fitted. The fit hole 43 includes a large-diameter portion $43_1$ through which the head $42_1$ of the support shaft 42 increased in diameter is inserted and a small-diameter portion $43_2$ in which the neck $42_2$ of the support shaft 42 is fitted. The support shaft 42 is inserted through the large-diameter portion $43_1$ of the fit hole 43 and then moved to a position located at the small-diameter portion $43_2$ thereof to engage the neck $42_2$ of the support shaft 42 with the small-diameter portion $43_2$ of the fit hole 43, resulting in the hinge 35 being assembled.

Referring now to FIGS. 13A to 13E, still another embodiment of an end seal structure according to the present invention is illustrated. In an end seal structure 3 of the illustrated embodiment, projections or connection ribs $34_1$ arranged on an outer surface of a seal base 34 is provided at one end of inner surfaces thereof with a pair of support shafts 42 in a manner to be opposite to each other. The support shafts 42 are fitted in a pair of fit holes 43, respectively, resulting in a pivotable hinge 35 being provided. In the illustrated embodiment, the support shafts 42 are each provided on an outer periphery thereof with a pair of holding ribs 48 and correspondingly the fit holes 43 are each formed with a pair of receiving recesses 49 in which the holding ribs 48 are fitted. Fitting of the holding ribs 48 in the receiving recesses 49 prevents the support shaft 42 from being rotated or pivotally moved in the fit hole 43, to thereby ensure positive operation of the hinge 35 while keeping the support shaft 42 from being detached from the fit hole 43, resulting in the seal base 34 being effectively kept closed. Alternatively, the illustrated embodiment may be constructed in such a manner that the support shaft 42 is provided with the receiving recesses 49 and the fit hole 43 is provided with the holding ribs 48. Such construction likewise effectively prevents rotation or pivotal movement of the support shaft 42 in the fit hole 43, to thereby keep the support shaft 42 from being detached from the fit hole 43.

Referring now to FIGS. 14A to 15D, a still further embodiment of an end seal structure according to the present invention is illustrated. In an end seal structure 3 of the illustrated embodiment, two halves of a split cable spacer 30 are each provided on an abutting joint face $30_1$ thereof with linear seal ribs 32 in a continuous manner. Each pair of the seal ribs 32 which are provided on the respective halves of the cable spacer 30 and correspond to each other are so constructed that distal ends thereof are formed so as to have inclined faces $32_3$, resulting in the inclined faces $32_3$ of each pair of the seal ribs 32 being opposite to each other while being rendered obliquely parallel to each other. Such construction permits the inclined faces $32_3$ of the corresponding seal ribs 32 to be overlapped each other, when the cable spacer 30 is closed, to thereby enhance sealing therebetween. In addition, the end seal structure 3 of the illustrated embodiment may be so constructed that the split cable spacer 30 is provided on each of opposite end surfaces thereof with recessed surface sections $32_2$ which have a conical or frust-conical shape about cable insertion passages 31. Such a recessed surface section may be provided about a support wire insertion passage 38. Such construction ensures satisfactory sealing between the cable spacer 30 and cables C or a support wire $C_1$ without forming any raised wall portion around the cable insertion passages 31 and support wire insertion passage 38 during abutting joint between the halves of the cable spacer 30, when the cables C and support wire $C_1$ are inserted through the passages 31 and 38 of the end seal structure 3 into a cable closure.

As can be seen from the foregoing, in the end seal structure of the present invention, the split cable spacer is made of a vulcanized rubber composition which has at least one of hardness of 0 to 10 and penetration of 40 to 90($10^{-1}$ mm), and which is of 500 to 2000% in elongation and 10 to 60 kgf/cm$^2$ in tensile strength and constructed in a manner to be splittable into two halves. Also, the split cable spacer is arranged so as to be pressedly contacted with the outer periphery of the cable and integrally provided with a plurality of the seal ribs, which are arranged along the cable insertion passage in a manner to be opposite to each other and spaced from each other at predetermined intervals. The seal ribs are each arranged in a manner to be operatively associated with the outer periphery of the cable. Further, the split end seal base is provided with the hinge which permits the split end seal base to be pivotally split into two halves. The split cable spacer is fittedly held in the split end seal base, so that the two halves of the split cable spacer may be detachably joined to each other through the abutting joint faces thereof. Such construction of the present invention, when the cables different in diameter are interposedly inserted through the seal base while the seal base is opened, permits the split cable spacer to be tightly contacted with the outer periphery of the cables in spite of the fact that the cables are different in diameter, so that the end seal structure may exhibit an increased sealing function. Such a sealing function is ensured even when any protrusion of the connection element remains on the cable or a sheath of the cable. Also, the above-described construction of the present invention substantially reduces time required for assembling and disassembling of the end seal structure. Further, such construction of the present invention attains installation of a new additional cable and maintenance of the cables with a reduced cost and without replacement of parts of the end seal structure. In addition, such construction ensures that the end seal structure is stably positioned with respect to the cylindrical casing of the cable closure, to thereby facilitate assembling thereof. Moreover, it permits the end seal structure assembled to exhibit satisfactory drip-proofness, watertightness or airtightness, as well as increased safety, resulting in being highly increased in reliability of operation of the end seal structure.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An end seal structure for a cable closure including a cylindrical casing for enclosing a cable connection section and a pair of end wall portions integrally provided on opposite ends of said cylindrical casing, each of said pair of end wall portions formed with a fit groove positioned at a central portion thereof, comprising:

a pair of end plates detachably fitted in said fit grooves, each of said pair of end plates being formed with at least one cable insertion passage through which a cable is inserted into said cylindrical casing;

each of said pair of end plates including a split cable spacer constructed in a manner to be splittable into two halves having abutting joint faces and arranged so as to be pressedly contacted with an outer periphery of said at least one cable;

said split cable spacer being made of a vulcanized rubber composition which has at least one of hardness of 0 to 10 as measured according to JIS S 6050 and penetration of 40 to 90 ($10^{-1}$ mm) as measured according to JIS K 2560, and which is of 500 to 2000% in elongation and 10 to 60 kgf/cm$^2$ in tensile strength as measured according to JIS K 6301;

said split cable spacer being integrally provided with a plurality of seal ribs arranged along said cable insertion passage in a manner to be opposite to each other and spaced from each other at predetermined intervals;

said plurality of seal ribs each being operatively associated with an outer periphery of said at least one cable when said at least one cable is inserted through said cable insertion passage;

each of said pair of end plates further including a split end seal base provided with a hinge which permits said split end seal base to be pivotally split into two halves;

said split cable spacer being fittedly held in said split end seal base, so that said halves of said split cable spacer may be detachably joined to each other through said abutting joint faces thereof, said abutting joint faces of said halves of said split cable spacer being disposed parallel to each other in a direction in which said cable is inserted through said split cable spacer, and said plurality of seal ribs is formed on said abutting joint faces of said halves of said split cable spacer so as to project from said abutting joint faces.

2. An end seal structure as defined in claim 1, wherein said split cable spacer has an outer peripheral surface contoured in conformity to an inner peripheral surface of said split end seal base; and said plurality of seal ribs each formed to have a substantially chevron shape and arranged on said abutting joint faces in a manner to be opposite to each other while being spaced from each other in an axial direction of said at least one cable.

3. An end seal structure as defined in claim 1, including a plurality of said cable insertion passages arranged in said cable spacer in parallel with each other.

4. An end seal structure as defined in claim 2, including a plurality of said cable insertion passages arranged in said cable spacer in parallel with each other.

5. An end seal structure as defined in claim 1, including a support wire insertion passage arranged in said cable spacer in parallel with said cable insertion passage.

6. An end seal structure as defined in claim 1, wherein said split end seal base comprises a frame member splitable at a central portion thereof into two halves in a longitudinal direction thereof;

said hinge being mounted on one end of said frame member and including a first member and a second member, said first member being provided on one end of one of said halves of said frame member and said second member being provided on one end of the other one of said halves of said frame member, said first and second members being detachably engaged with each other so that said halves of said frame member may be pivotally connected to each other through said hinge; and said frame member including at the other end of said halves thereof a holding section comprising a holding pawl and a receiving recess arranged opposite to said holding pawl so as to hold said holding pawl therein, whereby said abutting joint faces of said halves of said cable spacer fittedly held in said halves of said frame member may be detachably joined to each other thereby defining said cable insertion passage.

7. An end seal structure as defined in claim 2, said split end seal base comprising a frame member splitable at a central portion thereof into two halves in a longitudinal direction thereof;

said hinge being mounted on one end of said frame member and including a first member and a second member, said first member being provided on one end of one of said halves of said frame member and said second member being provided on one end of the other one of said halves of said frame member, said first and second members being detachably engaged with each other so that said halves of said frame member may be pivotally connected to each other through said hinge; and said frame member including at the other end of said halves thereof with a holding section comprising a holding pawl and a receiving recess arranged opposite to said holding pawl so as to hold said holding pawl therein, whereby said abutting joint faces of said halves of said cable spacer fittedly held in said halves of said frame member may be detachably joined to each other thereby defining said cable insertion passage.

8. An end seal structure as defined in claim 1, said split seal base being formed on an outer peripheral surface thereof and including strip-like projections fitted in said fit groove of said casing and on an inner peripheral surface thereof with ruggedness through which said split cable spacer is fittedly held in said split seal base;

said split seal base being made of a synthetic resin material increased in hardness as compared with that of said split cable spacer; and said split cable spacer being provided with a plurality of recessed grooves arranged along said cable insertion passage to be spaced from each other.

9. An end seal structure as defined in claim 2, said split seal base being formed on an outer peripheral surface thereof and including strip-like projections fitted in said fit groove of said casing and on an inner peripheral surface thereof with ruggedness through which said split cable spacer is fittedly held in said split seal base;

said split seal base being made of a synthetic resin material increased in hardness as compared with that of said split cable spacer; and said split cable spacer being provided with a plurality of recessed grooves arranged along said cable insertion passage to be spaced from each other.

10. An end seal structure as defined in claim 6, wherein said first member of said hinge of said seal base includes a pair of support shafts arranged opposite to each other to be spaced from each other and said second member of said hinge includes a pair of substantially U-shaped grooves in which said support shafts are fitted; and said support shafts being inserted through openings of said U-shaped grooves and pivotally moved 90 or 180 degrees, resulting in said hinge being assembled.

11. An end seal structure as defined in claim 8, wherein said first member of said hinge of said seal base includes a pair of support shafts arranged opposite to each other to be spaced from each other and said second member of said hinge includes a pair of substantially U-shaped grooves in which said support shafts are fitted; and said support shafts being inserted through openings of said U-shaped grooves and pivotally moved 90 or 180 degrees, resulting in said hinge being assembled.

12. An end seal structure as defined in claim 6, wherein said first member of said hinge of said seal base includes a pair of support shafts arranged opposite to each other to be spaced from each other and said second member of said hinge includes a pair of fit holes arranged so that said support shafts fit therein; and said support shafts being each formed on an outer periphery thereof with a holding rib and correspondingly said fit holes are each provided with a receiving recess for receiving said holding rib in such a manner that said fit hole is opposite to said holding rib.

13. An end seal structure as defined in claim 8, wherein said first member of said hinge of said seal base includes a pair of support shafts arranged opposite to each other to be spaced from each other and said second member of said hinge includes a pair of fit holes arranged so that said support shafts fit therein; and said support shafts are each formed on an outer periphery thereof with a holding rib and correspondingly said fit holes each being provided with a receiving recess for receiving said holding rib in such a manner that said fit hole is opposite to said holding rib.

14. An end seal structure as defined in claim 6, wherein said first member of said hinge of said seal base includes a support shaft provided on an outer end thereof including a head increased in diameter and said second member of said hinge includes a connection element formed with a fit hole;

said fit hole including a large-diameter portion through which said head of said support shaft is inserted and a small-diameter portion; and said support shaft inserted through said large diameter portion of said fit hole being moved to be fitted in said small-diameter portion of said fit hole, resulting in said hinge being assembled.

15. An end seal structure as defined in claim 8, wherein said first member of said hinge of said seal base includes a support shaft provided on an outer end thereof including a head increased in diameter and said second member of said hinge includes a connection element formed with a fit hole;

said fit hole including a large-diameter portion through which said head of said support shaft is inserted and a small-diameter portion; and said support shaft inserted through said largediameter portion of said fit hole being moved to be fitted in said small-diameter portion of said fit hole, resulting in said hinge being assembled.

16. An end seal structure as defined in claim 8, wherein said cable spacer includes a central wall between said plurality of recessed grooves;

said plurality of seal ribs provided at opposite ends of said abutting joint faces and on an abutting joint surface of said central wall of said cable spacer and arranged along said cable insertion passage to be spaced from each other; and said plurality of seal ribs each formed to have a shape reduced in thickness at a distal end thereof so as to be insertable into a gap between said abutting joint faces of said cable spacer and said at least one cable to ensure satisfactory sealing properties when said at least one cable is inserted through said cable insertion passage.

17. An end seal structure as defined in claim 10, wherein said cable spacer includes a central wall between said plurality of recessed grooves;

said plurality of seal ribs provided at opposite ends of said abutting joint faces and on an abutting joint surface of said central wall of said cable spacer and arranged along said cable insertion passage to be spaced from each other; and said plurality of seal ribs each formed to have a shape reduced in thickness at a distal end thereof so as to be insertable into a gap between said abutting joint faces of said cable spacer and said at least one cable to ensure satisfactory sealing properties when said at least one cable is inserted through said cable insertion passage.

18. An end seal structure as defined in claim 16, wherein said plurality of seal ribs are each formed so as to have an inclined face at said distal end thereof and are so arranged that said inclined faces of each pair of said plurality of seal ribs provided on the respective halves of said cable spacer correspond to each other and are opposite to each other while being rendered obliquely parallel to each other.

19. An end seal structure as defined in claim 17, wherein said plurality of seal ribs are each formed so as to have an inclined face at said distal end thereof and are so arranged that said inclined faces of each pair of said plurality of seal ribs provided on the respective halves of said cable spacer correspond to each other and are opposite to each other while being rendered obliquely parallel to each other.

20. An end seal structure as defined in claim 1, wherein said split cable spacer includes a recessed surface section having a conical shape about said cable insertion passage at each of opposite end surfaces thereof.

21. An end seal structure as defined in claim 2, wherein said split cable spacer includes a recessed surface section which has a conical shape about said cable insertion passage at each of opposite end surfaces thereof.

22. An end seal structure as defined in claim 6, wherein said holding section of said split end seal base includes an elastic element provided at a distal end thereof with said holding pawl; and said holding pawl and receiving recess of said holding section are arranged on respective free ends of said halves of said frame member opposite to said hinge to pressedly hold said cable spacer in said split end seal base.

23. An end seal structure as defined in claim 8, wherein said holding section of said split end seal base includes an elastic element provided at a distal end thereof with said holding pawl; and said holding pawl and receiving recess of said holding section arranged on respective free ends of said halves of said frame member opposite to said hinge to pressedly hold said cable spacer in said split end seal base.

24. An end seal structure as defined in claim 10, wherein said holding section of said split end seal base includes an elastic element provided at a distal end thereof with said holding pawl; and said holding pawl and receiving recess of said holding section arranged on respective free ends of said halves of said frame member opposite to said hinge to pressedly hold said cable spacer in said split end seal base.

\* \* \* \* \*

UNITED STATES PATENT AND TRADEMARK OFFICE
CERTIFICATE OF CORRECTION

PATENT NO. : 6,314,229 B1
DATED : November 6, 2001
INVENTOR(S) : Daijiro Sasaki, Tadashi Hattori, and Toshiaki Uehara Page 1 of 1

It is certified that error appears in the above-identified patent and that said Letters Patent is hereby corrected as shown below:

<u>Column 14,</u>
Line 9, delete "$10\text{-}^1 mm$", and insert therefor -- $10^{-1} mm$ --.

Signed and Sealed this

Second Day of April, 2002

Attest:

Attesting Officer

JAMES E. ROGAN
Director of the United States Patent and Trademark Office